(12) United States Patent
Baranowski

(10) Patent No.: US 7,486,648 B1
(45) Date of Patent: Feb. 3, 2009

(54) WIRELESS EXTENSION OF LOCAL AREA NETWORKS

(75) Inventor: Robert Baranowski, San Diego, CA (US)

(73) Assignee: Park Tours, Inc., San Diego, CA (US)

(*) Notice: Subject to any disclaimer, the term of this patent is extended or adjusted under 35 U.S.C. 154(b) by 2032 days.

(21) Appl. No.: 09/613,616

(22) Filed: Jul. 11, 2000

Related U.S. Application Data

(63) Continuation-in-part of application No. 09/525,340, filed on Mar. 14, 2000, now Pat. No. 6,813,608.

(60) Provisional application No. 60/158,725, filed on Oct. 11, 1999.

(51) Int. Cl.
  *H04Q 7/24* (2006.01)
  *H04Q 7/20* (2006.01)
(52) U.S. Cl. .............. 370/338; 370/252; 455/456.1; 709/218; 725/133
(58) Field of Classification Search ......... 370/335–338, 370/252; 714/57, 47; 710/8; 340/310.01; 455/420, 422.1, 453, 457, 418, 569.2, 421, 455/456.1; 701/209, 211; 709/218; 715/38; 725/133; 705/6, 211, 5
See application file for complete search history.

(56) References Cited

U.S. PATENT DOCUMENTS

| | | | | |
|---|---|---|---|---|
| 5,072,370 A | * | 12/1991 | Durdik | 714/47 |
| 5,890,088 A | * | 3/1999 | Nimura et al. | 701/211 |
| 5,946,617 A | * | 8/1999 | Portaro et al. | 455/422.1 |
| 6,067,583 A | * | 5/2000 | Gilbert | 710/8 |
| 6,122,759 A | * | 9/2000 | Ayanoglu et al. | 714/57 |
| 6,154,772 A | * | 11/2000 | Dunn et al. | 725/114 |
| 6,285,876 B1 | * | 9/2001 | Zhong | 455/424 |
| 6,351,639 B1 | * | 2/2002 | Motohashi | 455/420 |
| 6,389,010 B1 | * | 5/2002 | Kubler et al. | 370/353 |
| 6,526,293 B1 | * | 2/2003 | Matsuo | 455/573 |
| 6,653,932 B1 | * | 11/2003 | Beamish et al. | 340/310.01 |
| 6,813,608 B1 | * | 11/2004 | Baranowski | 705/6 |
| 2002/0019985 A1 | * | 2/2002 | Fuccello et al. | 725/133 |
| 2002/0046068 A1 | | 4/2002 | Koh | |
| 2003/0114233 A1 | | 6/2003 | Hiei | |
| 2005/0073407 A1 | | 4/2005 | Giraldin et al. | |

FOREIGN PATENT DOCUMENTS

WO 03032212 A1 4/2003

* cited by examiner

*Primary Examiner*—Afsar M. Qureshi
(74) *Attorney, Agent, or Firm*—Steven L. Nichols; Rader, Fishman & Grauer PLLC

(57) ABSTRACT

Existing LAN's, whether wired or wireless, rely on a wired-network backbone for connectivity, creating higher installation costs and less flexibility. Wireless access points provide for easier installation and more flexibility, but still rely on the wired backbone for network communication. A truly wireless access point, with a wireless connection back to the rest of the network, provides the ultimate ease of installation and flexibility to configure the network. These wireless access points, applied to the home or office environment, provide wireless networks without the overhead of building a physical, wired network between all networked devices.

15 Claims, 8 Drawing Sheets

WIRELESS EXTENSION OF LOCAL AREA NETWORKS

RELATED APPLICATIONS

This application is a continuation-in-part of U.S. patent application Nos. 09/525,340, filed Mar. 14, 2000 now U.S. Pat. No. 6,813,608 and 60/158,725, filed Oct. 11, 1999 (the "Parent Applications"). Both of which are incorporated herein by reference in their entireties.

FIELD

The present specification relates to the field of wireless data networks. More specifically, the present specification relates to base units that can be used to extend wireless local area networks ("LAN's").

BACKGROUND

Local Area Networks, or LAN's, are presently used to connect computers, printers, terminals, and other devices that benefit from interconnectivity within a facility, e.g. a home, office or business environment. LAN's are used to share information between users, to share devices such as printers, to enable point-of-sale transactions, and to share connectivity to the Internet.

LAN's are most commonly found in places of business, particularly office buildings. LAN's allow workers to communicate with each other, share files and information, and to share peripherals such as printers and scanners. LAN's are also common in the retail environment, enabling credit card processing and inventory tracking at the point-of-sale.

Traditional LAN's are implemented with a wired network protocol such as Ethernet or AppleTalk®. The wired network backbone is physically brought to, and a connection dropped at, each location that a worker or peripheral must access the network. Peripherals or computers then simply plug into the wired jacks that are installed in each such location.

As can be imagined, the installation of these wired networks to each jack can be time-consuming and expensive. And, once the wired network is installed, reconfigurations to the work environment are equally difficult and further complicated by the presence of the existing wired network.

Because of the expense of installing and reconfiguring the wired network, wireless networks are increasing in popularity. In particular, wireless networking is one of the technologies that is increasing the popularity of in-home networks. Installing traditional wired networks in the home environment proves to be more expensive than in the office environment because walls and ceilings in a home are traditionally designed with less accessibility for wiring as compared with walls and ceilings in an office environment. Wireless networks overcome this obstacle by allowing networked computers to wirelessly communicate with each other, creating wireless networking within the home or office.

FIG. 1 shows a typical implementation of a wireless network with wireless access points (100, 102). The access points (100, 102) are wireless transceivers physically connected to the wired LAN. A device with wireless communication capability within the range of the access points (100, 102) can be included in the LAN by wirelessly communicating with the network through an access point (100, 102). FIG. 1 shows the conventional implementation of such a network which has networked devices both wired (110, 112, 120) and networkly (114, 130) connected to the wired network backbone (e.g., 140). This combination is for illustrative purposes and may vary significantly in practical implementation.

FIG. 1 depicts an example of a conventional wireless network in the computing environment. In the home or office environment, the devices on the network could easily and alternatively be entertainment equipment, such as stereos, televisions, VCR's, or speakers. Portable devices (130) could be cameras, phones, or internet appliances.

For example, in FIG. 1, two personal computers (110, 112) are networked together in a traditional wired network. A peripheral (120), such as a printer, is connected directly to the network, giving both personal computers (110, 112) equal visibility to the peripheral (120).

The center of the wired network backbone is the network hub (140). This hub manages all of the network traffic, coordinating messages between all of the devices on the network. It is also responsible for managing each device's connection to the internet (160).

The access points (100, 102) are conventional wireless transceivers in that they connect through a wire directly to the network backbone and the network hub (140). The wireless coverage area of each device having wireless communications capability is defined by the circle around that device. Personal computer (114) is within range of access point (102), i.e., the access point (102) is within the transmission range of the computer (114) and vice versa. Communication through the access point (102) provides the computer (114) with network connectivity to the other personal computers (110, 112), to peripheral (120), and to the internet (160), through the network hub (140). The wireless communication circuitry built into personal computer (114) is not specifically illustrated and is essentially the same as the known circuitry in the access points (100, 102).

When application programs running on the personal computer (114) send messages to the other devices on the network or to the internet (160), those programs do not need knowledge of the wireless network. Application programs are those programs running under the operating system which provide features and services to the user. If the application programs are using an internet protocol such as TCP/IP running over the network, the same TCP/IP protocol can run over the wireless network. Low-level drivers in the personal computer (114) implement all network traffic over the wireless network, as opposed to low-level drivers in personal computers (110, 112) that implement all network traffic over the wired connections.

Portable device (130) establishes a similar connection to the network through access point (100) and network hub (140). The circle of wireless coverage around portable device (130) is smaller than the other coverage areas, indicating a lower-power wireless transmitter suitable for implementation in such a portable device (130). Implementation of the wireless circuitry in the portable device (130) is essentially the same as the circuitry found in the access points (100, 102) and other devices (e.g., 114), except for the smaller size and lower transmission power.

Application programs running on the portable device (130) also do not need to know about the wireless network if running an internet protocol such as TCP/IP. The portable device (130) simply needs drivers capable of interfacing to the wireless network circuitry, e.g. access points (100, 102). If the wireless communication of portable device (130) was disabled and a wired connection was formed directly to network hub (140), the application programs would work the same.

During normal operation, portable device (130) may fall into an area that allows wireless communication with both access points (100, 102) at the same time. In this scenario, the networking software determines which access point to use, or whether both access points should be used, during wireless communication. It is also possible for portable device (130) to be within the range of wireless communication with three or more access points simultaneously.

Wireless networks such as that illustrated in FIG. 1 have the advantages of being easier to build and reconfigure. Once the wireless access points (100, 102) are installed and connected to the wired network (140), computers (114) and peripherals with wireless capability can be placed or moved anywhere in the coverage area of the access points (100, 102).

Small entirety wireless LAN's can also be built without the use of such access points if all the networked devices are kept within radio frequency ("RF") range of each other. However, this requires relatively powerful and expensive wireless transceivers in networked device or necessarily limits the size of the area over which the LAN is deployed. The wireless connection is typically a low power RF connection that only covers a 150-foot radius. Many wireless networks use RF in the ISM band, and many commercial wireless networks employ the IEEE802.11 or OpenAir protocols in the 2.4 GHz band. There are many other protocols that are running over many other frequency bands, and many more on the way.

Thus, significant drawbacks to this wireless network implementation include the relatively high cost and size of the RF circuitry required to communicate from one side of a home to the other. This is not so significant problem for desktop computers or printers in which the necessary RF transceiver can be deployed with relative ease. However, it becomes an important issue with handheld Personal Digital Assistants (PDA's), cellular telephones, digital cameras, and other portable devices (130) that benefit from connection to the wireless network.

Therefore, in order to avoid severe limitations on the movement of portable devices within the LAN, additional access points must be added to insure complete coverage of the desired area. The addition of each further access point requires wired connections to be added to furnish the communication link between that access point and the network. This obviously complicates the installation of the network.

Consequently, there is a need in the art for an implementation of an access point that extends the wireless coverage into areas that allow wireless communication with portable devices that otherwise would be out of range without requiring the addition of a wired connection to that access point.

SUMMARY

The present specification describes a means and method of extending a wireless LAN with great flexibility as to how and where additional coverage area is established. For example, the indicated means and method of extending a wireless LAN described herein do not require additional wiring for further access points and are therefore easy to reconfigure as dictated by the evolving needs of the network. The present specification also describes how to increase the connectivity between the LAN and portable devices such that communication is enabled between the LAN and portable devices that would otherwise be out of range of the in-home or in-office wireless network.

The new access point replaces a portion of the traditional wired network with a wireless link to the next adjacent wireless device on the LAN. This device could be the desired computer or peripheral that a portable device wishes to communicate with, or it could be a traditional access point with a wired connection to the desired device. Additionally, the next adjacent device could be another wireless access point that subsequently wirelessly communicates with the next wireless device adjacent to it.

The architecture of the access point and the implemented wireless LAN is the same as that disclosed in Parent Applications. This access point and wireless LAN architecture can be extended to networks outside places of business and into the home and office environments.

With wireless communication links between the wireless access points, the only physical connection needed is to provide power to the circuitry. This allows for very efficient physical designs for the home or office environment, where power can be received from a nearby AC outlet. The design can be implemented either with a bow with a power cord coming from it, or with the wall plugs built in as part of the unit. Additionally, the circuitry could be implemented in any electronic device that already has power provided to it. This electronic device may optionally use the wireless circuitry to enhance its own functionality.

Once the connection to AC power is made through an outlet, an alternate design can be implemented where the wired network of the in-home or in-office LAN uses the AC electrical wires already installed. Computers and peripherals on the network would use existing modems that send and receive network information on the AC power lines. Transmission of the data is typically achieved by modulating a carrier that is much higher in frequency than the incoming AC power at 50 or 60 Hz. Using this scheme, access points would wirelessly connect with devices within RF range, and would tie these devices to the rest of the LAN through the AC power lines.

All of the described network scenarios and more can be more easily implemented if the wireless LAN was made up of small devices that simply plug into an outlet and provide wireless connectivity for the devices in that room. The box that plugs into the outlet may have some status indication, and possibly a power or a mode switch, as its entire external interface.

The present specification also describes a system including a wireless data local-area-network that supports wireless portable devices where the system includes a number of wireless access points in the network that receive wireless transmissions from the portable devices; and a process for determining the location of a portable device based on the transmissions received by any of the access points from said portable device. The location determination may be performed by either the portable device or the network. The functionality of the portable device can then be controlled in response to the determined location of the portable device. For example, a wireless phone may control its ringer volume or voice mail features based on its location, or a personal digital assistant may control the data provided and features available based on its location. This aspect of the invention may be implemented in a traditional LAN with wireless access points wired to the LAN or a completely wireless LAN as described herein.

BRIEF DESCRIPTION OF THE DRAWINGS

The accompanying drawings illustrate examples of the present invention and are a part of the specification. Together with the following description, the drawings demonstrate and explain the principles described herein.

Identical reference numbers denote identical elements throughout the drawings.

DETAILED DESCRIPTION

Figure 1:
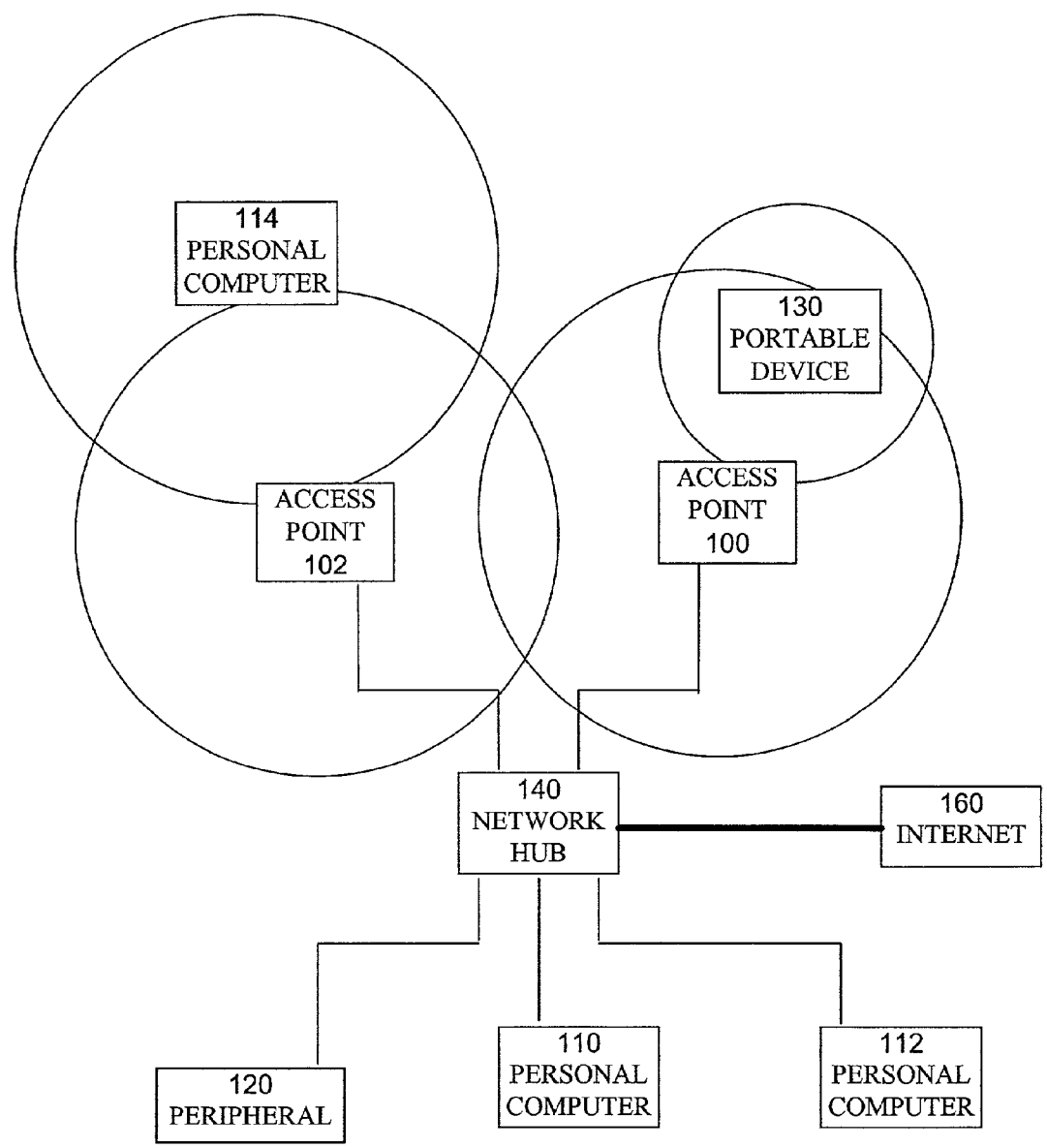
FIG. 1 is a block diagram of a conventional wired LAN with conventional access points.
Figure 2A:
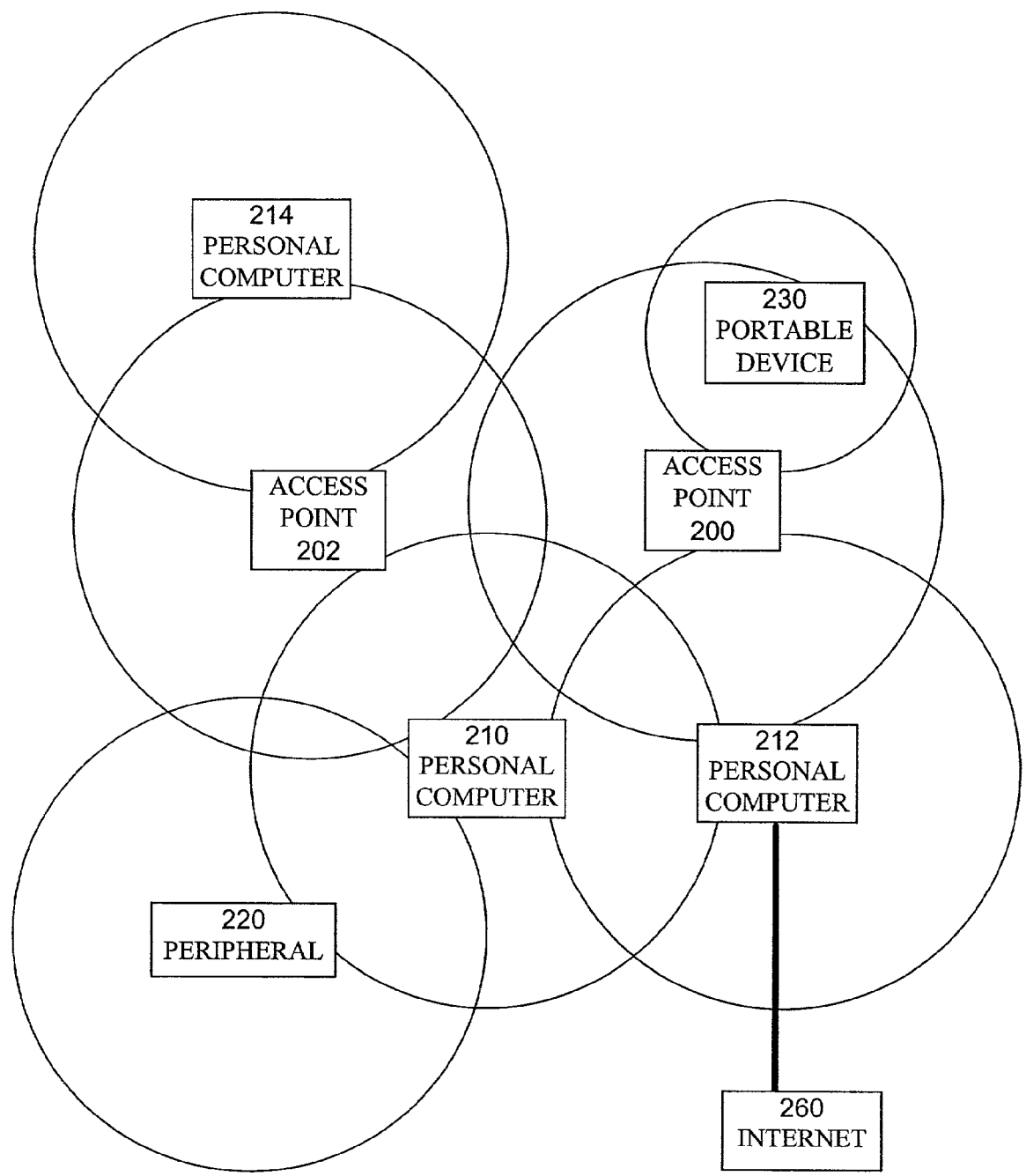
FIG. 2A is a block diagram of a completely wireless LAN with wireless access points.

FIG. 2A shows a fully wireless implementation of the same devices depicted in FIG. 1 according to principles described herein. In this configuration, personal computers (210, 212) wirelessly communicate directly with each other. Also, personal computer (210) wirelessly communicates with peripheral (220).

As FIG. 2A shows for this implementation, there is no direct wireless communication link between personal computer (212) and peripheral (220). In this instance, all messages from personal computer (212) addressed to peripheral (220) must be relayed through personal computer (210). This complicates network implementation software for the wireless devices on the network, but tremendously improves the coverage area and installation implementation of the wireless network.

This message repeating can be extended to multiple stages of message relaying in order to provide communication between any two networked devices. For example, if personal computer (210) is not within range of personal computer (212), a message could be transmitted from the computer (212) to the peripheral (220) as follows. The message transmitted by the computer (212) would be relayed by access point (200), access point (202), and personal computer (210) before receipt by the peripheral (220).

The network in FIG. 2A can also allow direct communication, i.e., without any message relay, between two networked devices which are within range of each other. For example, personal computers (210, 212) have the ability to wirelessly communicate with each other directly. Similarly, the peripheral (220) may be deployed within range to the personal computer (212) so that communication between the computer (212) and the peripheral (220) can occur directly without message relaying. This eliminates the scenario in which the personal computer (210) must repeat or relay messages passed between the personal computer (212) and the peripheral (220).

FIG. 2A also shows the implementation of completely wireless access points (200, 202). As shown in the FIG. 2A, access point (200) directly wirelessly communicates with personal computer (212), and access point (202) directly wirelessly communicates with personal computer (210). The access points (200, 202) are not wired to a LAN as in the prior art illustrated in FIG. 1. Consequently, the access points (200, 202) can be easily and readily deployed as necessary to extend the network as desired.

Figure 2B:
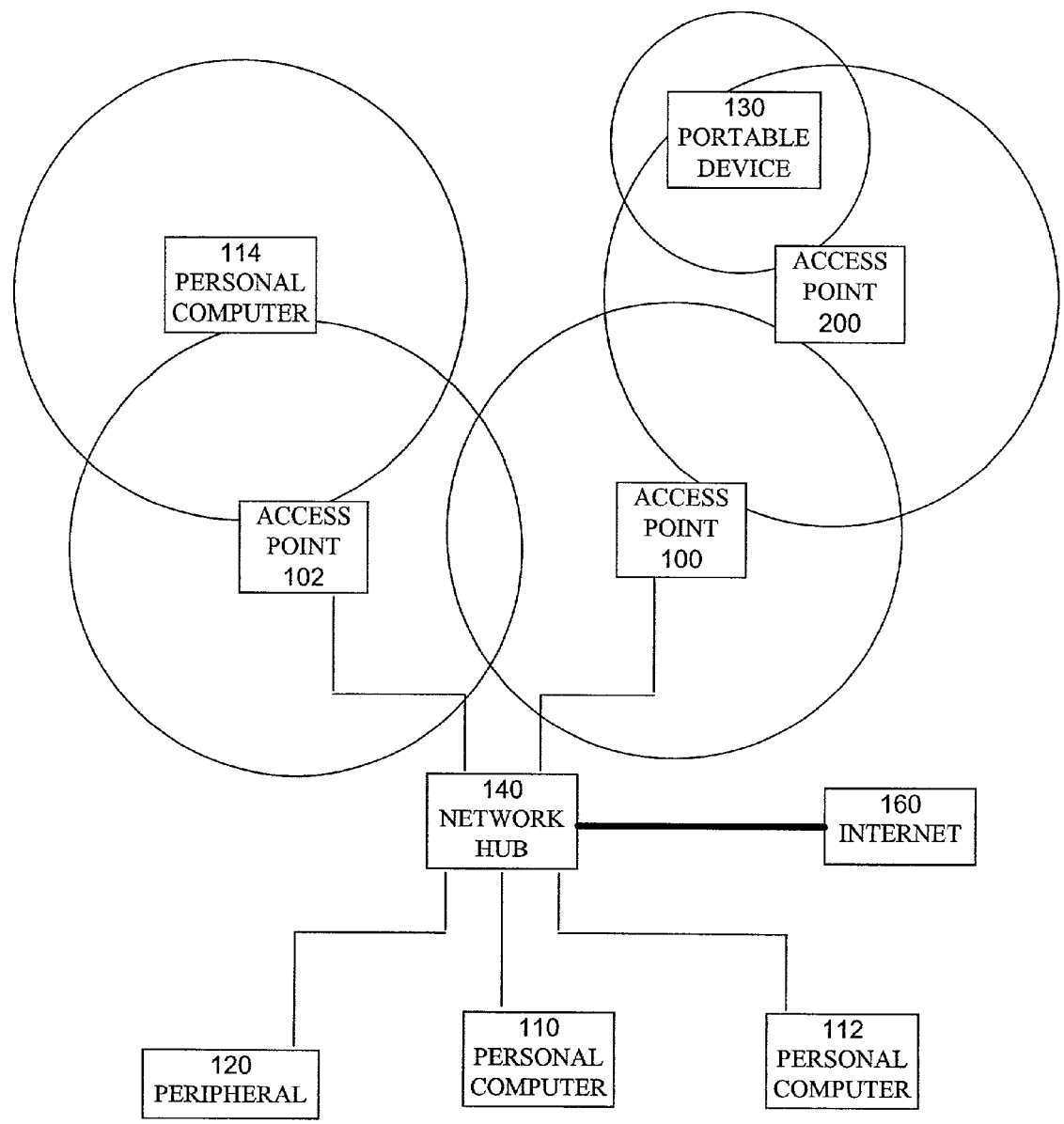
FIG. 2B is a block diagram of a conventional wireless LAN which has been extended using the completely wireless access points.

As shown in FIG. 2B, a wireless access point (200) can also be added to a traditional wired network as depicted in FIG. 1 to extend the coverage of the network. As shown in FIG. 2B, the wireless access point (200) wireless connects a portable device (130) with the rest of the networked devices through access point (100) which is, in turn, wired into the wired network through the network hub (140).

Figure 2C:
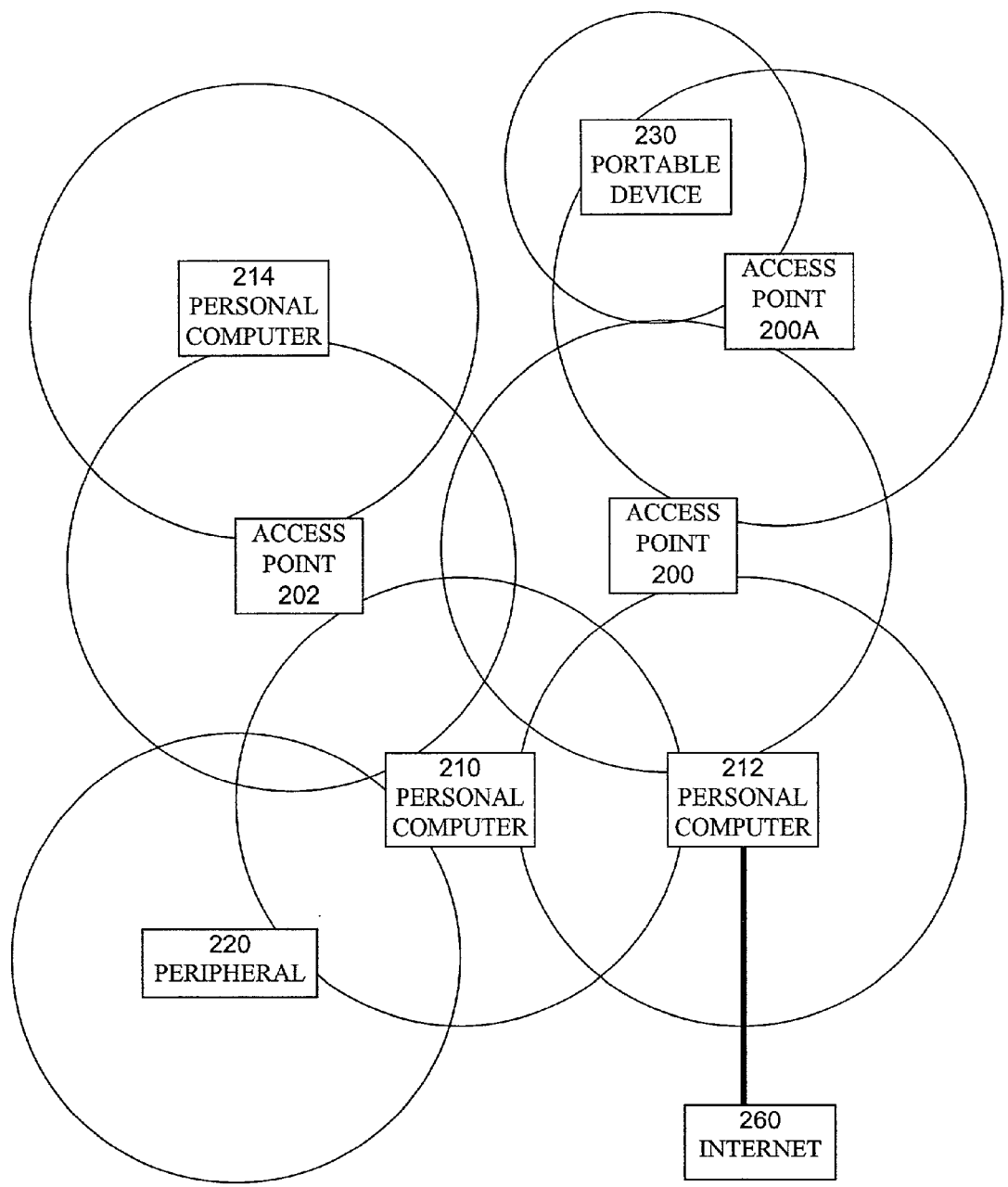
FIG. 2C is a block diagram of a wireless LAN which has been extended using a plurality of communicating access points.

FIG. 2C further illustrates the principle in which multiple access points can relay messages between networked devices in order to extend the network as needed with great flexibility. As shown in FIG. 2C, the portable device (230) is beyond the coverage of the access point (200). However, an intervening access point (200A) is provided which can relay messages between the portable device (230) and the access point (200). Through access point (200A), the portable device can send messages to or receive messages from any of the other devices constituting the network.

The nature of the access points (200, 200A, 202), which are completely wireless and require no wired connections, allow the access points to be implemented in a wide variety of physical embodiments. Specifically, the wireless_access point described herein, that do not require a wired network connection, may be a small box with a power cord extending from it, a box with power outlet plugs extending directly from the box, a box with a threaded connector to be screwed into a light fixture in place of a standard light bulb or a similar implementation. These physical implementations allow simple installation and flexibility that cannot be achieved with access points that require wired network connections.

The connection to the internet (260) for the LAN may be through personal computer (212) as shown in FIGS. 2A and 2C. For any of the devices on the LAN to access the internet (260), messages are routed through personal computer (212), as well as any devices necessary to get the messages to and from personal computer (212). Alternatively, the connection to the Internet may also be through a network hub (140) as shown in FIG. 2B, with wireless message relaying being implemented as required to establish a link between the hub (140) and the networked device that is utilizing the Internet.

The connection to the internet described herein is a wired connection which may be preferred for its bandwidth. However, embodiments in which the LAN has a wireless connection to the internet through, for example, a wireless telephone or similar infrastructure, may also be included under the principles described herein.

Figure 3:
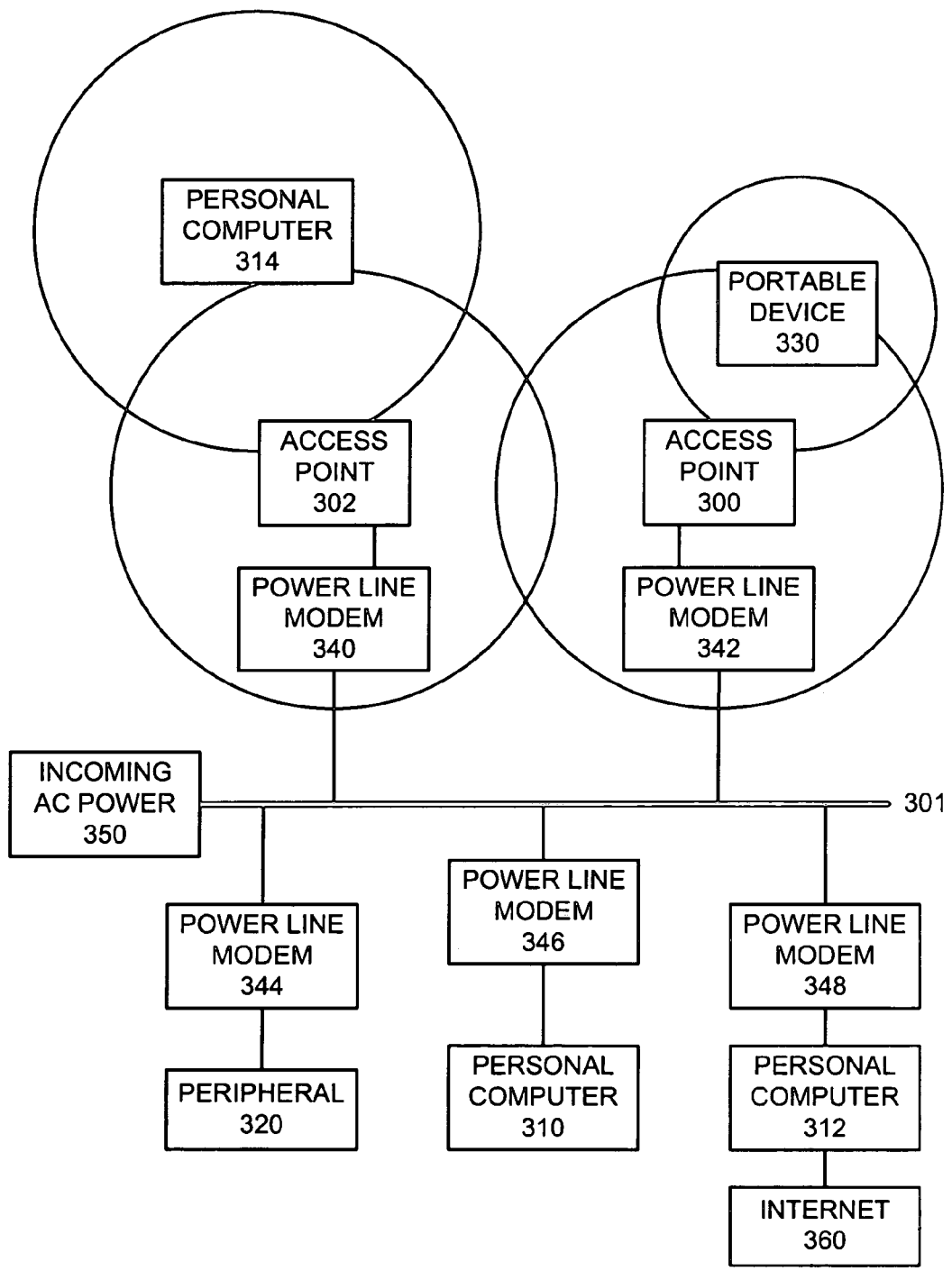
FIG. 3 is a block diagram of a combination of a wired LAN over power lines and power-line access points.

FIG. 3 shows an alternative implementation of an access point that connects into an existing wired network that uses power-line modems and an AC power line for connectivity. As shown in FIG. 3, personal computers (310, 312) and peripheral (320) are all networked using existing power-line networking technology in the form of power-line modems (344, 346, 348). All messages for any devices on the network (e.g., 320, 310, 312, 314 and 330) are broadcast on the power line (301), and each power-line modem (e.g., 340, 342, 344, 346, 348) ignores all messages except the ones intended for its device or a device wireless communicating with an access point (300, 302) connected to that power-line modem (340, 342). The intended recipient device of a message is defined by the internet protocol, such as TCP/IP.

As in the previous figures, the portable device (330) and personal computer (314) wirelessly communicate with access points (300) and (302) respectively. The access points (300, 302) receive the wireless messages from the portable device (330) and personal computer (314) and broadcast them to the power-line network (301) through power-line modems (342) and (340) respectively. Any messages that are intended for the portable device (330) are received by power-line modem (342) and broadcast by access point (300) to the portable device (330). Any messages intended for personal computer (314) are received by power-line modem (340) and broadcast by access point (302) to the personal computer (314).

As in the previous figures, internet connection for the LAN is done through a single internet connection point (360) through personal computer (312). In this network topology, all messages bound for the internet (360) are placed on the AC power line, received by power-line modem (348), and passed to the internet connection (360) by personal computer (312).

Actual product implementation may combine access point (300) with power-line modem (342) in a single package, keeping similar physical implementations to that of access points (200, 202).

Figure 4:
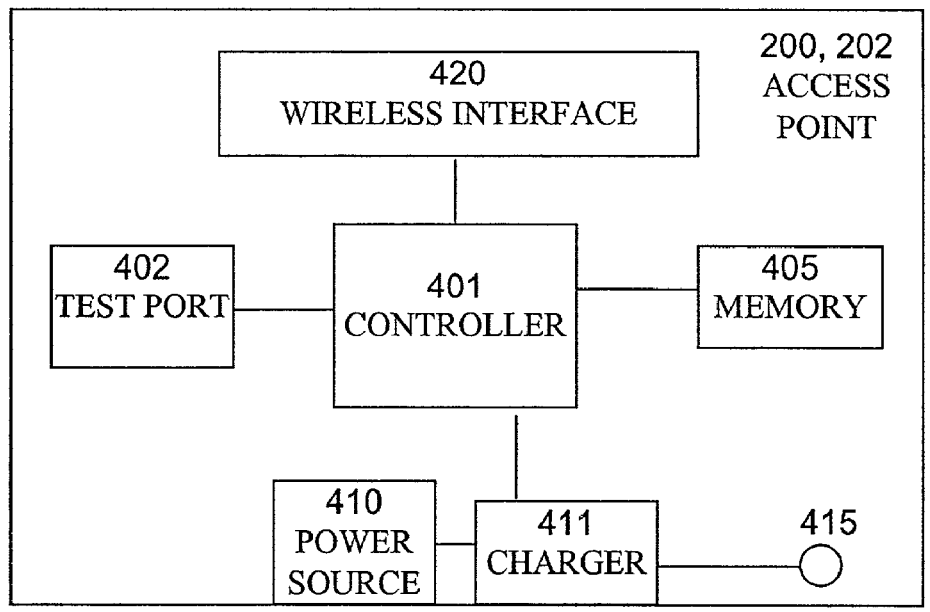
FIG. 4 is a block diagram of a wireless access point.

FIG. 4 shows an exemplary architecture of the wireless access points (200, 202). Controller (401) controls the state of the access point and the messages that are passed. For each message that is received, controller (401) determines if that message should be relayed to the next wireless device or ignored. Memory (405) is a combination of volatile and non-volatile storage that holds the executable networking program running on the controller (401), configuration information, and temporary data. The wireless interface (420) is used to send and receive wireless messages to/from any other wireless devices within range, whether it is a portable device, the next relay point, or the final destination of the message.

Power is provided to the access point through connector (415). In some implementations, AC power will be supplied on connector (415), and an AC/DC power converter is incorporated within the access point. In other implementations, a regulated DC voltage comes in on connector (415), which eliminates the need for internal power conversion. The AC power supplied to the connector (415) may be from a conventional wall outlet into which the access point (200, 202) is plugged or a light bulb socket into which the access point (200, 202) is screwed.

An optional alternate power source (410) can be used to power the access point (200, 202) when external power is not present. The alternate power source (410) can be a rechargeable temporary storage, or can be a generating device that uses solar, wind, or water energy to generate power for the access point (200, 202). The alternate power source may be any combination of those described. In the case of a rechargeable storage device, charger (411) recharges the device when external power is present on connector (415).

Initial configuration and advanced diagnostics can be done using a test port (402). In system diagnostics can be done through wireless commands received over the network, with results transmitted wirelessly back the requestor.

Figure 5:
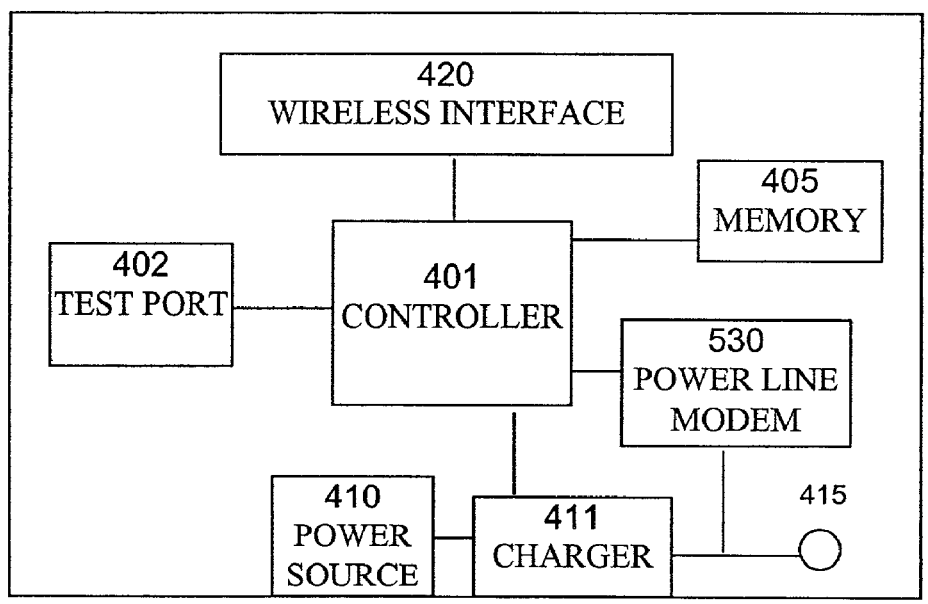
FIG. 5 is a block diagram of a power-line access point.

FIG. 5 is a block diagram of a power-line network access point (e.g., 300, 302 in FIG. 3), implemented as the combination of access point (300, FIG. 3) and power-line modem (342, FIG. 3). Most blocks have the same functionality as in FIG. 4, with the addition of the power-line modem (530). This modem (530) sends and receives messages between the controller (401) and the AC power line (301, FIG. 3) through connector (415).

Figure 6A:
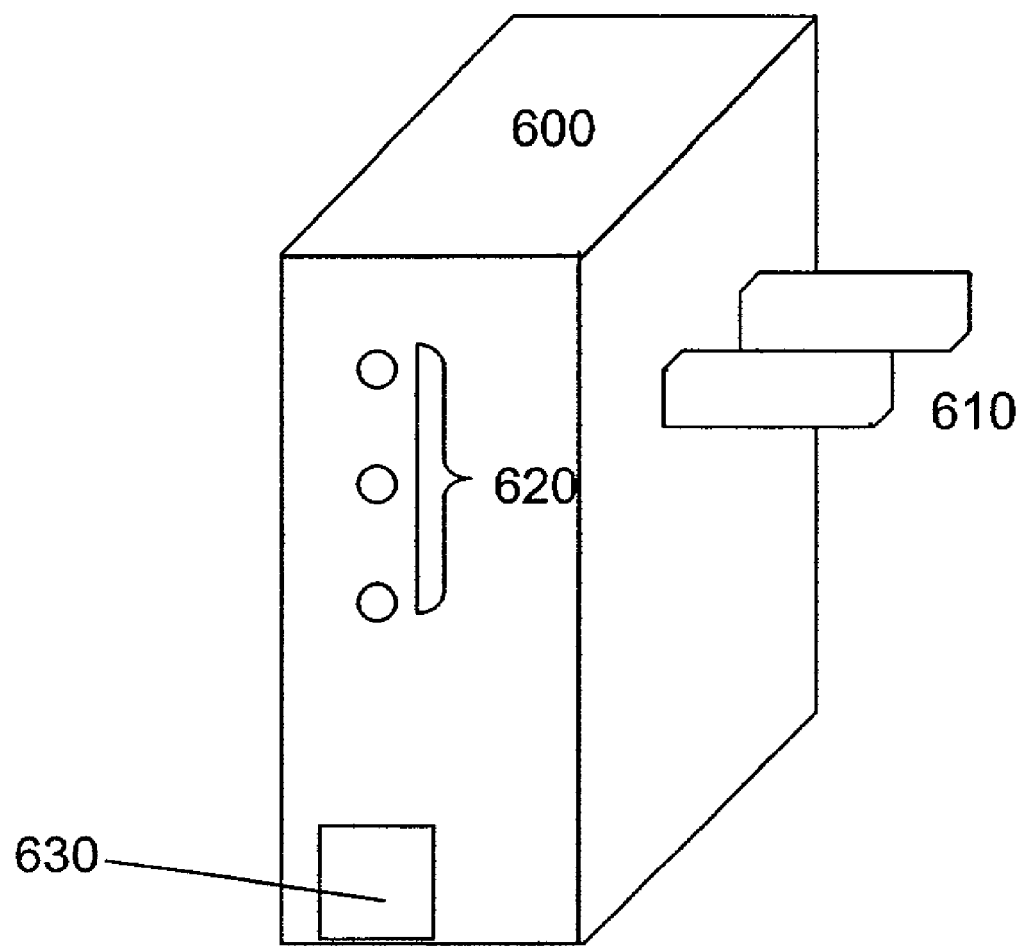
FIG. 6A illustrates a first possible physical implementation of either the wireless access point or the power-line access point.

FIG. 6A shows a possible physical implementation of access points (200, 202, 300, 302). The housing (600) of the access point contains all of the circuitry included in FIGS. 4 and 5, including any AC/DC power conversion device. Power is input through plug prongs (610), which plug directly into a wall outlet. To accommodate the different plug interfaces in different countries, the configuration of the prongs (610) may be interchangeable or there may be different versions of the physical implementation for different countries. To facilitate portability, the prongs (610) may fold away or collapse when not in use.

Status indicators (620) can be implemented using simple LED's. These indicators tell at a glance if the access point (200, 202, 300, 302) is powered on, transmitting wireless data, communicating with wireless devices, or is communicating with the LAN backbone. Other indicators that are deemed beneficial can be added or put in place of any of these functions.

The physical implementation of the access point may include a switch (630) for turning the device on or off. This would allow leaving the access point 'mounted' in the wall outlet while powering down the wireless network for any reasons.

Figure 6B:
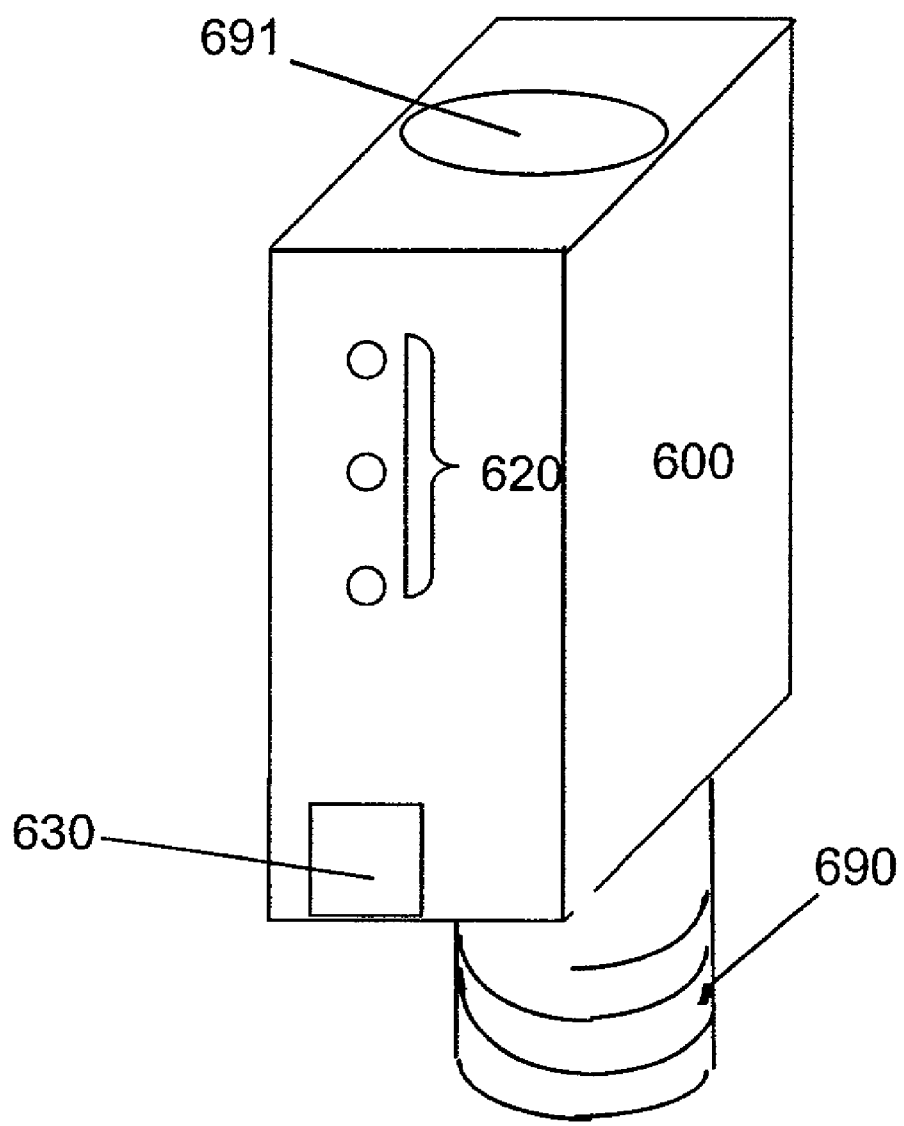
FIG. 6B illustrates a second possible physical implementation of either the wireless access point or the power-line access point.

FIG. 6B illustrates an alternative physical implementation for the access point of the present invention. The embodiment of FIG. 6B is substantially identical to that of FIG. 6A, however, the prongs (610) are replaced by a threaded connector (690) which is sized to be screwed into a light socket that accepts a light bulb. The access point then draws power from the light socket.

A second light bulb socket (691) may be provided in the housing of the access point and electrically connected to the socket in which the access point is disposed. In this way, a light bulb can be screwed into the access point socket (691) so that the access point draws power from the original bulb socket without preventing a light bulb from being powered by the socket as well.

FIGS. 6A and 6B shows two possible physical embodiments for the access points described herein. Alternatively, the access point could be built into another fixed electronic device, such as a personal computer, television, or into an outlet strip that already has a built-in surge protector. The access point could also be designed for implementation outdoors, which would entail the housing and the electrical connection being weatherproof.

The present specification also describes the method of extending the wireless coverage of a LAN with access points that do not require a wired network connection back to the LAN. The specification also covers the method of making a network of wireless access points that are easy to install, configure and reconfigure due to the wireless interface to the rest of the network.

Under the principles described herein, the wireless network can also be used to determine the location of a portable device connected wirelessly to the network and use that location in controlling the activity of the portable device. As detailed in the Parent Applications, the location of a portable device within the wireless LAN can be determined by the access point(s) that are within wireless communication range, i.e., communicating with the portable device. If an access point is communication with the portable device, for example, the known location of that access point is a reasonable proxy of the location of the portable device itself.

If necessary, finer location accuracy is possible by using a combination of two or more access points receiving transmissions from the portable device and measuring the relative signal strength received by each such access point. This can be done by the controller and hardware of the access point (200, 202). From this data, the approximate location of the portable device between the communicating access points within the wireless LAN coverage area can be determined in a manner that will be clear to those skilled in the art. This determination is made by the controller(s) of the access points (200, 202) communicating with the portable device (130). The determined location can then be communicated to the portable device (130). This principle can be applied to the home or office environment, with the network being aware of the particular room or office that a portable device is located within.

Alternatively, the portable device (130) can perform the same location determination based on the signals received from the access points (200, 202) with which it, the portable device (130), communicates. The controller and hardware of the portable device (130) are used to determine the location of the portable device (130) in the same manner described above. The location of the portable device (130) may then be transmitted to the network as needed.

Features or information provided by the network to the portable device may differ based upon the location of a portable device within the wireless LAN coverage area. Several examples of this principle follow. In the home environment, a portable device may allow remote control functionality of the living room television when located within the living room. The same portable device may act as a recipe database when located in the kitchen. This may include having access to recipe information from a larger database on the network.

In the office environment, a personal digital assistant ("PDA") may be a portable networked device. Traditionally, PDA's are able to remind the holder of meeting and appointments. The location-based functionality may display a map or other indication of the location of the meeting and provide direction to the meeting location from the present location of the portable networked device as determined by the network or the portable device. The device may also alert a user of an upcoming meeting earlier if the distance to the meeting is relatively far from the portable device's current location. A wireless phone may also be a networked device. The networked phone may automatically raise the volume of its ringer if the network determines that the phone is located on a noisy factory floor or automatically lower the ringer volume if the network determines that the phone is located in a conference room or similar area. The networked phone may also automatically deactivate the ringer and take a message if an incoming personal call is received while the employee is sitting in, for example, his or her boss's office or a meeting for which "privacy" has been indicated.

Additionally, a wireless access point, being mounted in a fixed location within the LAN, may store information pertaining to that location to improve the functionality of the wireless network. For example, an access point located in the vendor conference room of an office may limit transactions and implement a tighter security level. An access point within the office of an employee may retrieve and store email messages for that employee, making email retrieval from a portable device instantaneous. The preferences of the access point can be set in a configuration mode or can be learned by the network transactions that take place using the access point. These preferences can change if the location of a particular access point changes.

The preceding description has been presented only to illustrate and describe the invention. It is not intended to be exhaustive or to limit the invention to any precise form disclosed. Many modifications and variations are possible in light of the above teaching.

The preceding description is intended to enable others skilled in the art to best utilize the invention in various embodiments and with various modifications as are suited to the particular use contemplated. It is intended that the scope of the invention be defined by the following claims.

The invention claimed is:

1. A system including a network that supports wireless portable devices, the system comprising:
   a plurality of wireless access points in said network which receive wireless transmissions from said portable devices;
   a processor for determining a location of a portable device based on transmissions received by any of said plurality of access points from said portable device, wherein said processor may be in said wireless portable device or may be in an access point or other networked device;
   wherein a functionality of said portable device is altered in response to said determined location.

2. The system of claim 1, wherein said portable device comprises a wireless phone unit that controls a ringer volume according to said determined location.

3. The system of claim 1, wherein said portable device comprises a wireless phone unit that controls a voice mail feature according to said determined location.

4. The system of claim 1, wherein said portable device provides different features or information according to said determined location.

5. The system of claim 1, wherein said portable device displays a map comprising an indication of a location of said portable device and a location of an upcoming appointment.

6. The system of claim 5, wherein said portable device further displays directions to said location of said upcoming appointment.

7. A method of controlling a wireless portable device for use with a network that supports wireless portable devices, said network further comprising a plurality of wireless access points which receive wireless transmissions from said portable device, and a device, which is incorporated into said portable device or into said network, for determining a location of said portable device based on transmissions received by any of said plurality of access points from said portable device, the method comprising altering a functionality of said portable device in response to said determined location.

8. The method of claim 7, wherein said portable device comprises a wireless phone unit, and said method further comprises automatically adjusts a ringer volume of said wireless phone unit based on conditions of said determined location.

9. The method of claim 8, wherein said method comprises increasing said ringer volume if said determined location has conditions comprising ambient noise.

10. The method of claim 8, wherein said method comprises decreasing said ringer volume if said determined location is a conference room.

11. The method of claim 7, wherein said portable device comprises a wireless phone unit with voice mail, and said method further comprises automatically activating and deactivating a ringer of said wireless phone unit in response to said determined location, wherein at least one location within an area of said network is associated with having said ringer deactivated.

12. The method of claim 7, said method further comprises providing different features or information in response to said determined location.

13. The method of claim 7, wherein said portable device is a personal digital assistant, and said method further comprises adjusting an amount of time prior to a scheduled event that an alert of said event is given based on said determined location and a distance between said determined location and a location associated with said scheduled event.

14. The method of claim 7, further comprising displaying a map with said portable device that includes an indication of a location of said portable device and a location of an upcoming appointment.

15. The method of claim 14, further comprising displaying directions to said location of said upcoming appointment.

* * * * *